(12) United States Patent
Stevens et al.

(10) Patent No.: US 7,348,989 B2
(45) Date of Patent: Mar. 25, 2008

(54) PREPARING DIGITAL IMAGES FOR DISPLAY UTILIZING VIEW-DEPENDENT TEXTURING

(75) Inventors: Randall S. Stevens, Lexington, KY (US); David T. Guinnip, Lexington, KY (US); Jaynes Christopher, Lexington, KY (US)

(73) Assignee: Arch Vision, Inc., Lexington, KY (US)

( * ) Notice: Subject to any disclaimer, the term of this patent is extended or adjusted under 35 U.S.C. 154(b) by 0 days.

(21) Appl. No.: 10/383,959

(22) Filed: Mar. 7, 2003

(65) Prior Publication Data

US 2004/0174373 A1 Sep. 9, 2004

(51) Int. Cl.
*G09G 5/00* (2006.01)

(52) U.S. Cl. ............... 345/582; 345/420; 345/421; 345/427; 345/552; 345/583; 345/584; 345/585; 345/586; 382/285

(58) Field of Classification Search ......... 345/535–586
See application file for complete search history.

(56) References Cited

U.S. PATENT DOCUMENTS

| | | | |
|---|---|---|---|
| 4,987,554 A | 1/1991 | Kaufman | |
| 5,548,694 A | 8/1996 | Frisken Gibson | |
| 5,550,960 A | 8/1996 | Shirman et al. | |
| 5,583,975 A | 12/1996 | Naka et al. | |
| 5,756,354 A | 5/1998 | Tzidon et al. | |
| 5,790,713 A * | 8/1998 | Kamada et al. | 382/285 |
| 5,831,623 A | 11/1998 | Negishi et al. | |
| 6,084,979 A | 7/2000 | Kanade et al. | |
| 6,108,006 A | 8/2000 | Hoppe | |
| 6,181,348 B1 | 1/2001 | Geiger | |
| 6,271,847 B1 | 8/2001 | Shum et al. | |
| 6,278,460 B1 | 8/2001 | Meyers et al. | |
| 6,281,904 B1 | 8/2001 | Reinhardt et al. | |
| 6,346,939 B1 | 2/2002 | Isaacs | |
| 6,356,272 B1 | 3/2002 | Matsumoto et al. | |
| 6,359,618 B1 | 3/2002 | Heirich | |
| 6,363,170 B1 | 3/2002 | Seitz et al. | |
| 6,456,287 B1 * | 9/2002 | Kamen et al. | 345/427 |
| 6,525,731 B1 * | 2/2003 | Suits et al. | 345/427 |
| 6,918,093 B2 | 7/2005 | Broussard | |
| 2002/0075332 A1 | 6/2002 | Geilfuss et al. | |
| 2002/0180783 A1 | 12/2002 | Broussard | |
| 2005/0246644 A1 | 11/2005 | Broussard | |

* cited by examiner

*Primary Examiner*—Kee M. Tung
*Assistant Examiner*—Antonio A Caschera
(74) *Attorney, Agent, or Firm*—Dinsmore & Shohl LLP.

(57) ABSTRACT

A computer program embodied on a computer-readable medium, a computer readable medium storing computer-executable instructions, and a computer data signal embodied in a carrier wave, all for providing a graphic image utilizing view-dependent texture data, including a graphic data code segment for providing data representing a graphic image and a texture data code segment in operational association with the graphic data code segment.

2 Claims, 9 Drawing Sheets

PREPARING DIGITAL IMAGES FOR DISPLAY UTILIZING VIEW-DEPENDENT TEXTURING

BACKGROUND OF THE INVENTION

The present invention relates broadly to computer software for graphical representation of physical objects, and, more particularly, to a method and system for enhancing digital graphical images to achieve a high level of realism, especially for complex objects and 3-D computer graphics.

As computers have become more powerful, the ability to create realistic computer graphics has been enhanced. Conventional computer graphics techniques revolve around rendering even greater volumes of polygonal geometry in order to achieve higher image fidelity. The general approach has been aided by an ever-increasing availability of compute cycles. While increasing compute cycles increases traditional rendering throughput, there remain barriers to increased realism using this approach. No matter how much computer capacity is available at a given time, there exists a threshold beyond which the number of polygons in a computer graphics scene cannot be efficiently rendered and increasing the compute, or rendering cycles does little to aid in the actual creation of photorealistic content.

SUMMARY OF THE INVENTION

An improved approach is to combine detailed image data in the form of textures with minimal polygonal geometry in order to minimize the polygonal load on the rendering engine and to improve the overall image fidelity by integrating "pre-rendered" image data. By applying image data to underlying polygonal hulls based on viewing position, further improvements in image fidelity can be achieved while relieving the traditional rendering pipeline of compute-intensive calculations such as self-shadowing and specularity, both important to achieving increased realism.

The use of View Dependent Textures (VDT) in the present invention is also enhanced through the use of a Master Texture Coordinate System (MTCS) through which a single set of texture coordinates can be used, minimizing the need to store texture coordinates for each view dependent image, increasing the rendering pipeline speed which is essential for such applications as stimulation where images must be rendered at up to 60 Hz, and providing for increased texture compression by incorporating only visible data in the texture set. A discussion of the general approach is found in *Efficient Image-Based Projective Mapping Using The Master Texture Space Encoding*; by Randall Stevens, David Guinnip, David Rice, and Christopher Jaynes; *Journal of WSCG*, Vol. 11, No. 1, Feb. 3-7, 2003, which is incorporated herein by reference.

It is accordingly an object of the present invention to provide a computer program, computer readable media, and a digital signal embodied in a carrier wave to provide graphic data including view-dependent texture data to enhance the appearance of a 3-D image produced on a computer screen.

It is another object of the present invention to provide view-dependent texture data that is utilized within the image data without the need for storing or applying varying texture coordinates for each vertex on an image model.

It is another object of the present invention to provide image and texture data that can be displayed quickly based on the viewing position of an object or model.

According to one preferred embodiment, the present invention is directed to a computer program embodied on a computer-readable medium for providing a graphic image utilizing view-dependent texture data. The computer program includes a graphic data code segment for providing data representing a graphic image and a texture data code segment in operational association with the graphic data code segment. The texture data code segment includes view-dependent texture data formed by:

(1) deriving a low polygon count mesh from data obtained from at least one of a plurality of source images;

(2) forming a master texture coordinate space by reforming the low polygon count mesh into an optimized 2-D space;

(3) forming at least one view-dependent texture by remapping each of the plurality of source images into the master texture coordinate space by extracting source image data correlating with non-occluded polygons from the low polygon count mesh;

(4) locating and identifying any occluded polygons and, if occluded polygons are found, extracting image data from where projection of the occluded polygons is non-occluded; and (5) assigning texture coordinate data to each projected vertex on the mesh using the master texture coordinate space, thereby providing common texture data for each image in the graphic data code segment.

The present invention may also be described in a more detailed manner. Accordingly, the present invention is directed to a computer program embodied on a computer-readable medium for providing a graphic image utilizing view-dependent texture data. The computer program includes a graphic data code segment for providing data representing a graphic image and a texture data code segment in operational association with the graphic data code segment. The texture data code segment includes view-dependent texture data formed by:

(1) determining a relative viewing position for each virtual observer in 3-D space for which a plurality of source images was derived using a visual calibration system;

(2) determining a relative position of each pixel in each source image within the plurality of source images with respect to each viewing position, the relative positions being used to form a low polygon count mesh;

(3) forming a master texture coordinate space by reforming the low polygon count mesh into an optimized 2-D space;

(4) assigning a common texture coordinate for each projected vertex on the mesh using the master texture coordinate space, resulting in a set of common texture coordinates;

(5) determining intersecting image data by determining correspondence between pixels in a source image and non-occluded polygons on the polygonal mesh;

(6) remapping the intersecting image data into the master texture coordinate space;

(7) calculating occluded polygons from the viewing position of each source image on the polygonal mesh;

(8) calculating secondary image data corresponding to each occluded polygon from any remaining source image; and (9) mapping the secondary image data into the master texture coordinate space, the resultant master texture coordinate space providing view-dependent texture data for application to underlying image geometry within the graphic data code segment.

It is preferred that the visual calibration system includes a grid having known coordinates. Further, the acquisition of the source image data may include constraining a path determined by the optimal viewer position of the resultant object in order to preserve undefined object details in any the source image.

Preferably, the source image data is weighted to synthesize a predetermined resultant appearance of a displayed image.

The low polygon count mesh may be formed using a voxel coloring method. Additionally, the low polygon count mesh may be formed by digitizing a physical object that is the subject of the source images. Further, the low polygon count mesh may be formed using a correspondence-based triangulation method.

The present invention can also reside in a computer data signal embodied in a carrier wave, which accounts for Internet or other broadcast transmission of the program, or image file. The computer data signal includes computer-executable instructions defining a graphic data code segment for providing data representing a graphic image and computer-executable instructions defining a texture data code segment in operational association with the graphic data code segment, the texture data code segment including view-dependent texture data formed by:

(1) deriving a low polygon count mesh from data obtained from at least one of a plurality of source images;

(2) forming a master texture coordinate space by reforming the low polygon count mesh into an optimized 2-D space;

(3) forming at least one view-dependent texture by remapping each of the plurality of source images into the master texture coordinate space by extracting source image data correlating with non-occluded polygons from the low polygon count mesh;

(4) locating and identifying any occluded polygons and, if occluded polygons are found, extracting image data from where projection of the occluded polygons is non-occluded; and (5) assigning texture coordinate data to each projected vertex on the mesh using the master texture coordinate space, thereby providing common texture data for each image in the graphic data code segment.

The present invention may also be described in a more detailed manner. Accordingly, the computer data signal embodied in a carrier wave includes computer-executable instructions defining a graphic data code segment for providing data representing a graphic image; and computer-executable instructions defining a texture data code segment in operational association with the graphic data code segment, the texture data code segment including view-dependent texture data formed by:

(1) determining a relative viewing position for each virtual observer in 3-D space for which a plurality of source images was derived using a visual calibration system;

(2) determining a relative position of each pixel in each source image within the plurality of source images with respect to each viewing position, the relative positions being used to form a low polygon count mesh;

(3) forming a master texture coordinate space by reforming the low polygon count mesh into an optimized 2-D space;

(4) assigning a common texture coordinate for each projected vertex on the mesh using the master texture coordinate space, resulting in a set of common texture coordinates;

(5) determining intersecting image data by determining correspondence between pixels in a source image and non-occluded polygons on the polygonal mesh;

(6) remapping the intersecting image data into the master texture coordinate space;

(7) calculating occluded polygons from the viewing position of each source image on the polygonal mesh;

(8) calculating secondary image data corresponding to each occluded polygon from any remaining source image; and (9) mapping the secondary image data into the master texture coordinate space, the resultant master texture coordinate space providing view-dependent texture data for application to underlying image geometry within the graphic data code segment.

It is preferred that the visual calibration system includes a grid having known coordinates. Further, the acquisition of the source image data may include constraining a path determined by the optimal viewer position of the resultant object in order to preserve undefined object details in any the source image.

Preferably, the source image data is weighted to synthesize a predetermined resultant appearance of a displayed image.

The low polygon count mesh may be formed using a voxel coloring method. Additionally, the low polygon count mesh may be formed by digitizing a physical object that is the subject of the source images. Further, the low polygon count mesh may be formed using a correspondence-based triangulation method.

Another preferred embodiment of the present invention resides in a computer-readable medium storing computer-executable instructions for providing a graphic image utilizing view-dependent texture data. The computer-readable medium includes computer-executable instructions defining a graphic data code segment for providing data representing a graphic image and computer-executable instructions defining a texture data code segment in operational association with the graphic data code segment, the texture data code segment including view-dependent texture data formed by:

(1) deriving a low polygon count mesh from data obtained from at least one of a plurality of source images;

(2) forming a master texture coordinate space by reforming the low polygon count mesh into an optimized 2-D space;

(3) forming at least one view-dependent texture by remapping each of the plurality of source images into the master texture coordinate space by extracting source image data correlating with non-occluded polygons from the low polygon count mesh;

(4) locating and identifying any occluded polygons and, if occluded polygons are found, extracting image data from where projection of the occluded polygons is non-occluded; and (5) assigning texture coordinate data to each projected vertex on the mesh using the master texture coordinate space, thereby providing common texture data for each image in the graphic data code segment.

The computer-readable medium of the present invention can also be described in greater detail. Accordingly, the computer-readable medium storing computer-executable instructions for providing a graphic image utilizing view-dependent texture data includes computer-executable instructions defining a graphic data code segment for providing data representing a graphic image and computer-executable instructions defining a texture data code segment in operational association with the graphic data code segment, the texture data code segment including view-dependent texture data formed by:

(1) determining a relative viewing position for each virtual observer in 3-D space for which a plurality of source images was derived using a visual calibration system;

(2) determining a relative position of each pixel in each source image within the plurality of source images with respect to each viewing position, the relative positions being used to form a low polygon count mesh;

(3) forming a master texture coordinate space by reforming the low polygon count mesh into an optimized 2-D space;

(4) assigning a common texture coordinate for each projected vertex on the mesh using the master texture coordinate space, resulting in a set of common texture coordinates;

(5) determining intersecting image data by determining correspondence between pixels in a source image and non-occluded polygons on the polygonal mesh;

(6) remapping the intersecting image data into the master texture coordinate space;

(7) calculating occluded polygons from the viewing position of each source image on the polygonal mesh;

(8) calculating secondary image data corresponding to each occluded polygon from any remaining source image; and (9) mapping the secondary image data into the master texture coordinate space, the resultant master texture coordinate space providing view-dependent texture data for application to underlying image geometry within the graphic data code segment.

It is preferred that the visual calibration system includes a grid having known coordinates. Further, the acquisition of the source image data may include constraining a path determined by the optimal viewer position of the resultant object in order to preserve undefined object details in any the source image.

Preferably, the source image data is weighted to synthesize a predetermined resultant appearance of a displayed image.

The low polygon count mesh may be formed using a voxel coloring method. Additionally, the low polygon count mesh may be formed by digitizing a physical object that is the subject of the source images. Further, the low polygon count mesh may be formed using a correspondence-based triangulation method.

The present invention, according to another preferred embodiment thereof resides in a method for forming view-dependent texture data for enhancing a graphic image including steps of:

(1) deriving a low polygon count mesh from data obtained from at least one of a plurality of source images;

(2) forming a master texture coordinate space by reforming the low polygon count mesh into an optimized 2-D space;

(3) forming at least one view-dependent texture by remapping each of the plurality of source images into the master texture coordinate space by extracting source image data correlating with non-occluded polygons from the low polygon count mesh;

(4) locating and identifying any occluded polygons and, if occluded polygons are found, extracting image data from where projection of the occluded polygons is non-occluded; and (5) assigning texture coordinate data to each projected vertex on the mesh using the master texture coordinate space, thereby providing common texture data for each image in the graphic data code segment.

The method of the present invention may also be described in greater detail. Therefore, the method for forming view-dependent texture data for enhancing a graphic image includes steps of:

(1) determining a relative viewing position for each virtual observer in 3-D space for which a plurality of source images was derived using a visual calibration system;

(2) determining a relative position of each pixel in each source image within the plurality of source images with respect to each viewing position, the relative positions being used to form a low polygon count mesh;

(3) forming a master texture coordinate space by reforming the low polygon count mesh into an optimized 2-D space;

(4) assigning a common texture coordinate for each projected vertex on the mesh using the master texture coordinate space, resulting in a set of common texture coordinates;

(5) determining intersecting image data by determining correspondence between pixels in a source image and non-occluded polygons on the polygonal mesh;

(6) remapping the intersecting image data into the master texture coordinate space;

(7) calculating occluded polygons from the viewing position of each source image on the polygonal mesh;

(8) calculating secondary image data corresponding to each occluded polygon from any remaining source image; and (9) mapping the secondary image data into the master texture coordinate space, the resultant master texture coordinate space providing view-dependent texture data for application to underlying image geometry within the graphic data code segment.

It is preferred that the visual calibration system includes a grid having known coordinates. Further, the acquisition of the source image data may include constraining a path determined by the optimal viewer position of the resultant object in order to preserve undefined object details in any the source image.

Preferably, the source image data is weighted to synthesize a predetermined resultant appearance of a displayed image.

The low polygon count mesh may be formed using a voxel coloring method. Additionally, the low polygon count mesh may be formed by digitizing a physical object that is the subject of the source images. Further, the low polygon count mesh may be formed using a correspondence-based triangulation method.

The present invention can also be described in terms of a computer system. There, a computer system for displaying graphic image data, with the graphic image data utilizing view-dependent texture data for enhancement thereof, includes a graphic data code segment for providing data representing a graphic image and a texture data code segment in operational association with the graphic data code segment, the texture data code segment including view-dependent texture data formed by:

(1) deriving a low polygon count mesh from data obtained from at least one of a plurality of source images;

(2) forming a master texture coordinate space by reforming the low polygon count mesh into an optimized 2-D space;

(3) forming at least one view-dependent texture by remapping each of the plurality of source images into the master texture coordinate space by extracting source image data correlating with non-occluded polygons from the low polygon count mesh;

(4) locating and identifying any occluded polygons and, if occluded polygons are found, extracting image data from where projection of the occluded polygons is non-occluded; and (5) assigning texture coordinate data to each projected vertex on the mesh using the master texture coordinate space, thereby providing common texture data for each image in the graphic data code segment.

As before, the computer system of the present invention can be described in greater detail. Accordingly, a computer system for displaying graphic image data, with the graphic image data utilizing view-dependent texture data for enhancement thereof, the computer system includes a graphic data code segment for providing data representing a graphic image and a texture data code segment in operational association with the graphic data code segment, the texture data code segment including view-dependent texture data formed by:

(1) determining a relative viewing position for each virtual observer in 3-D space for which a plurality of source images was derived using a visual calibration system;

(2) determining a relative position of each pixel in each source image within the plurality of source images with respect to each viewing position, the relative positions being used to form a low polygon count mesh;

(3) forming a master texture coordinate space by reforming the low polygon count mesh into an optimized 2-D space;

(4) assigning a common texture coordinate for each projected vertex on the mesh using the master texture coordinate space, resulting in a set of common texture coordinates;

(5) determining intersecting image data by determining correspondence between pixels in a source image and non-occluded polygons on the polygonal mesh;

(6) remapping the intersecting image data into the master texture coordinate space;

(7) calculating occluded polygons from the viewing position of each source image on the polygonal mesh;

(8) calculating secondary image data corresponding to each occluded polygon from any remaining source image; and (9) mapping the secondary image data into the master texture coordinate space, the resultant master texture coordinate space providing view-dependent texture data for application to underlying image geometry within the graphic data code segment.

It is preferred that the visual calibration system includes a grid having known coordinates. Further, the acquisition of the source image data may include constraining a path determined by the optimal viewer position of the resultant object in order to preserve undefined object details in any the source image.

Preferably, the source image data is weighted to synthesize a predetermined resultant appearance of a displayed image.

The low polygon count mesh may be formed using a voxel coloring method. Additionally, the low polygon count mesh may be formed by digitizing a physical object that is the subject of the source images. Further, the low polygon count mesh may be formed using a correspondence-based triangulation method.

By the above the present invention provides an enhanced image by having view-dependent texture data applied to the underlying geometry without the need for storing or applying varying texture coordinates to each vertex of a model. The resultant mesh and texture data can be displayed quickly and is dependent upon the viewing position with respect to the model. View-dependent texturing provides a highly detailed representation of an object, while preserving important visual details such as the specularity that has, in the past, been merely omitted or has required time consuming, compute-intensive rendering operations.

DESCRIPTION OF THE PREFERRED EMBODIMENT

The present invention is intended to provide computer graphics software users with enhanced realism in digital images produced by their software. Such detail is especially useful when using highly realistic photograph-based images such as those provided by ArchVision Inc. under the trademark RPC, which stands for "Rich Photorealistic Content." The present invention is also effective with other images, such as computer-generated images.

In order to achieve enhanced realism, the present invention provides realistic texture data for use by graphic display software that will provide realistic textures from 3-D images based on the viewing position and, more particularly, in the case of photo-based images, the viewing position of the cameras used to capture the images for display. The present invention can provide view-dependent texture data that is applied to the underlying geometry of an image, or a plurality of images, without the need for storing or applying varying texture coordinates for each vertex on an image model. The image data associated with the present invention, including the mesh and texture data can be displayed quickly based on the viewing position of the model. Therefore, the view-dependent texture data in an RPC file provides a highly detailed representation of an object preserving important visual detail such as specularity that is generally omitted or that requires compute-intensive rendering operations.

The present invention involves several processes which are applied in succession to achieve several data structures which are used in subsequent processes to achieve other data structures which ultimately result in a Master Texture Coordinate Space (MTCS) including view-dependent texture data for each image, from each viewing position.

According to two preferred embodiments thereof, the present invention is depicted in a method and system for producing view-dependent texture data to enhance a digital graphic image. While the present technique can be applied to images that are not photographically-derived, the full benefit of the invention is realized with the photographically-derived images. According to one preferred embodiment of the present invention, the method, as mentioned above includes several process steps leading to a data structure wherein the data structure is reapplied in subsequent process steps.

Figure 1:
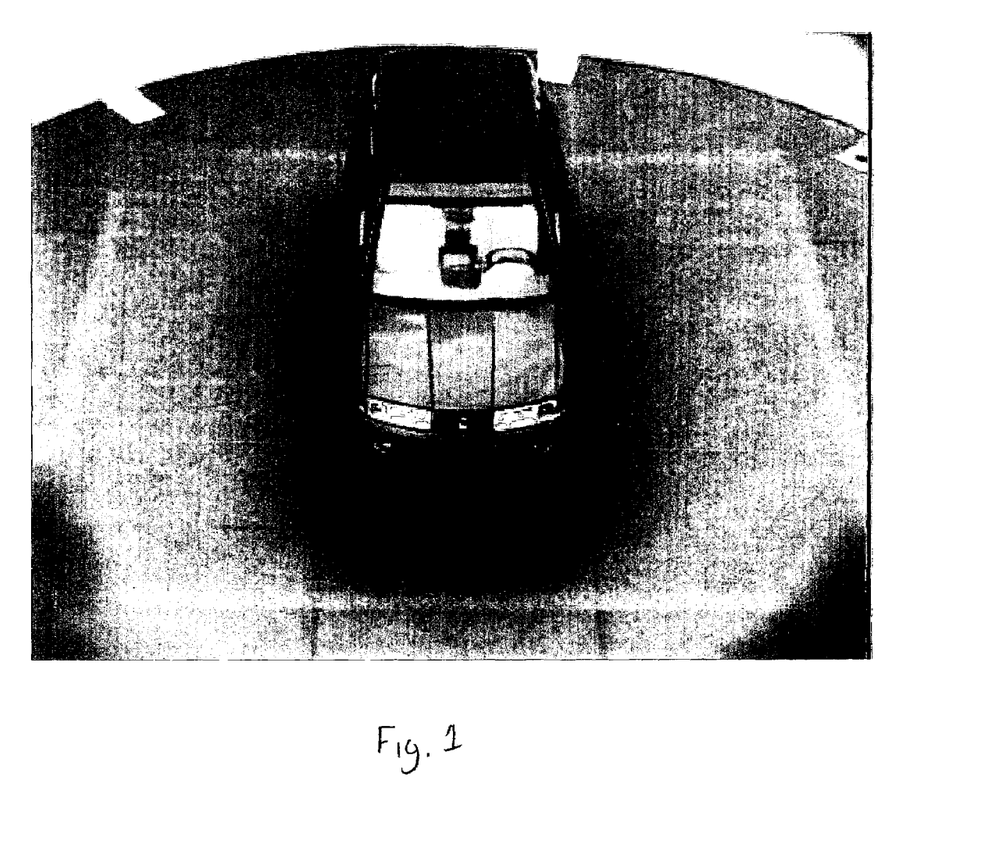
FIG. 1 is a photograph of a vehicle as the subject matter of a source image from a first viewing position.
Figure 2:
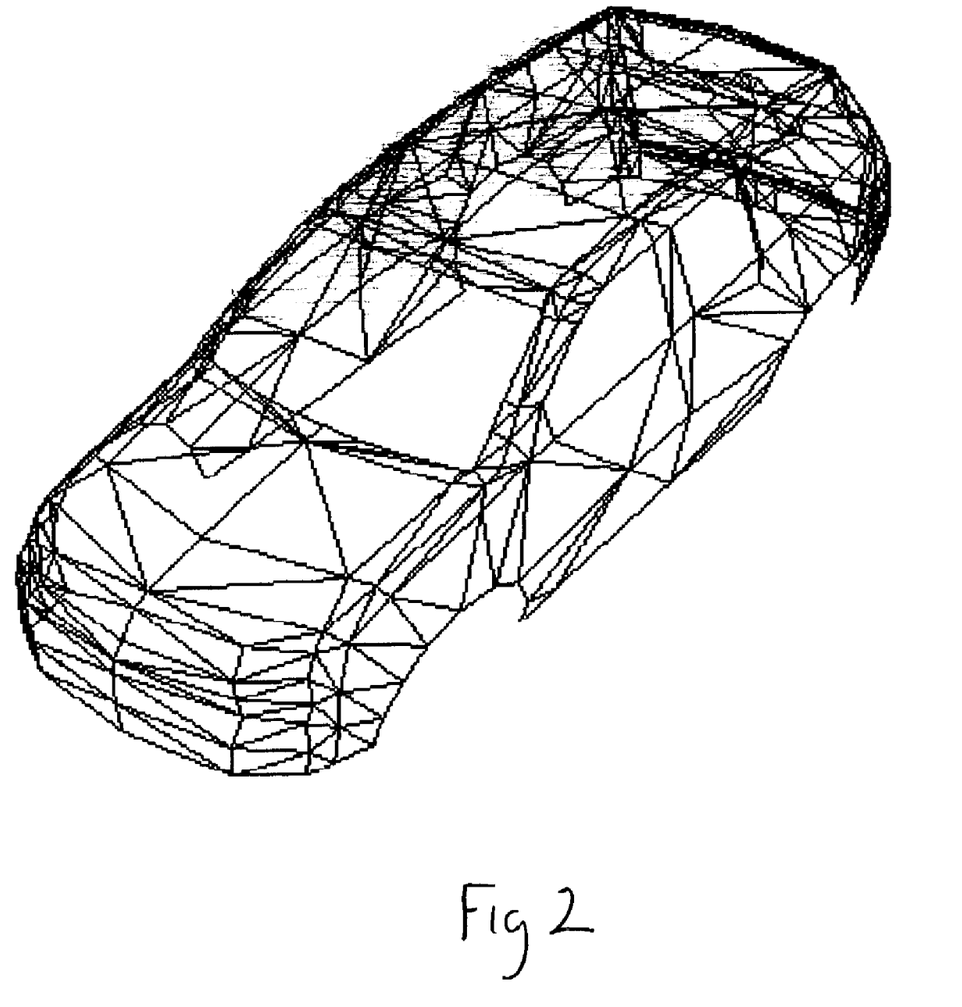
FIG. 2 is a polygonal mesh representation of the vehicle in FIG. 1 from a second viewing position.
Figure 3:
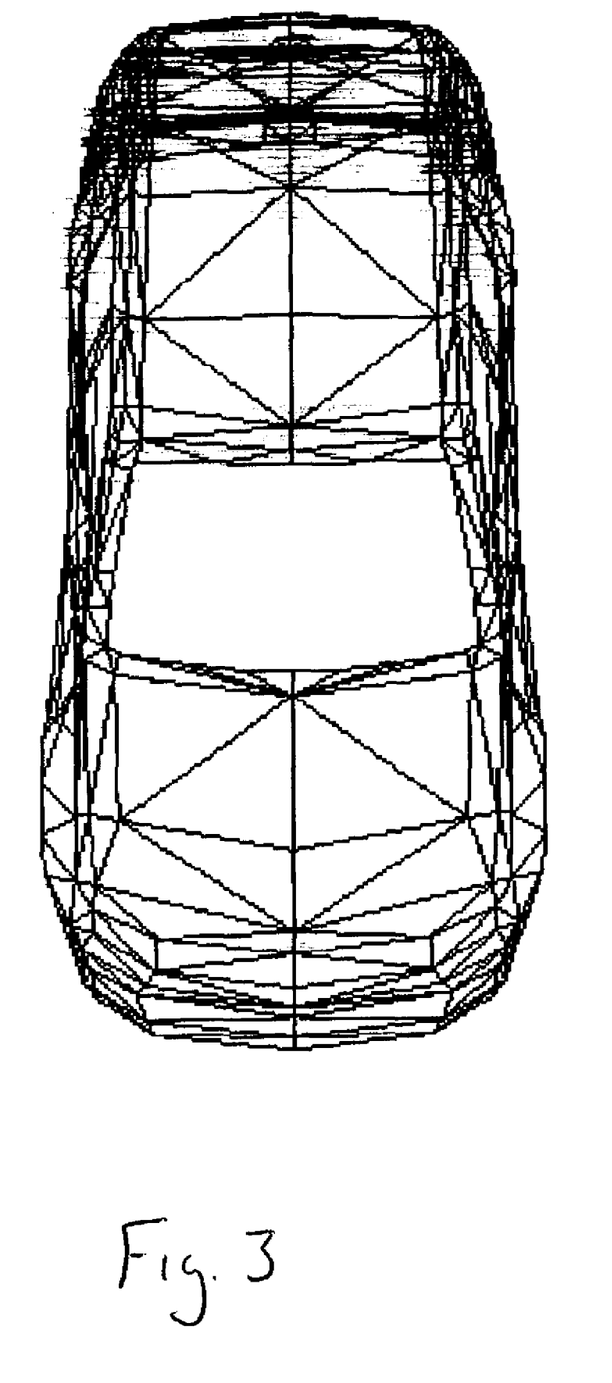
FIG. 3 is a polygonal mesh representation of the vehicle in FIG. 1 from the first viewing position.

First, it should be realized that the 3-D image for display is based on two or more different source images from two or more different viewing or camera positions. A photographic source image from a first viewing position is illustrated in FIG. 1. The first step includes deriving a low polygon count mesh from data obtained from at least one of a plurality of source images. FIG. 2 illustrates a low polygon count mesh model of the vehicle depicted in the photograph of FIG. 1, from a second, distinct viewing position. FIG. 3 depicts a low polygon count mesh model from the first viewing position. The next step includes forming a master texture coordinate space (MTCS) by reforming the low polygon count mesh into an optimized 2-D space.

Next, the method includes forming at least one view-dependent texture by remapping each of the plurality of source images into the MTCS by extracting source image data correlating with non-occluded polygons from the low polygon count mesh.

Figure 4:
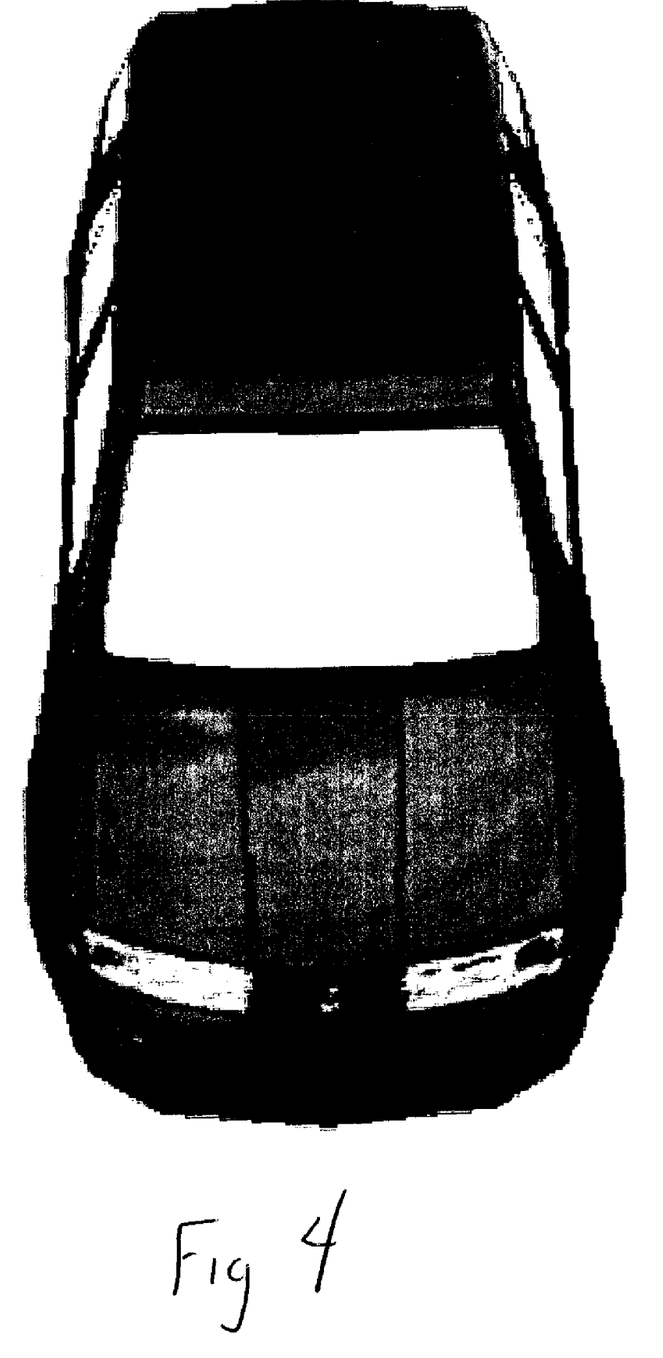
FIG. 4 is a computer rendering of the vehicle in FIG. 1, from the first viewing position.
Figure 5:
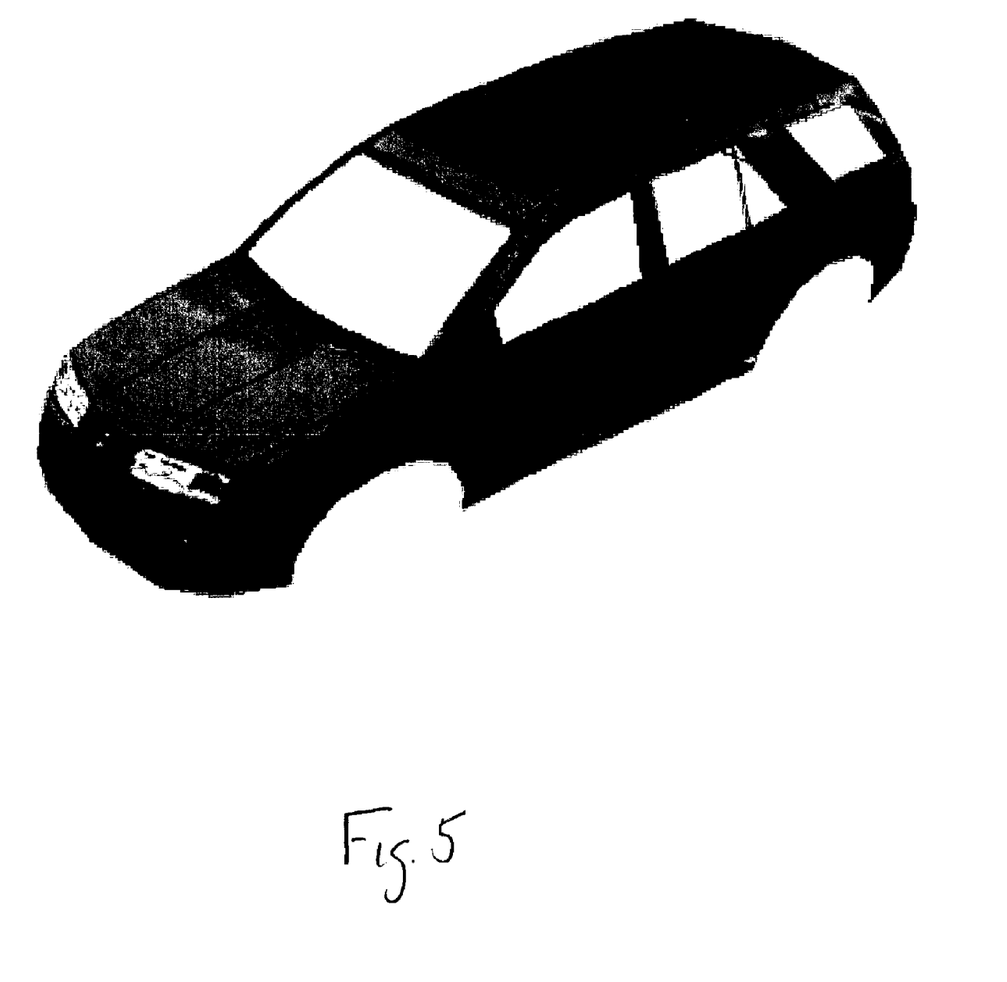
FIG. 5 is a computer rendering of the vehicle in FIG. 1, taken from the second viewing position, without benefit of the present invention.
Figure 6:
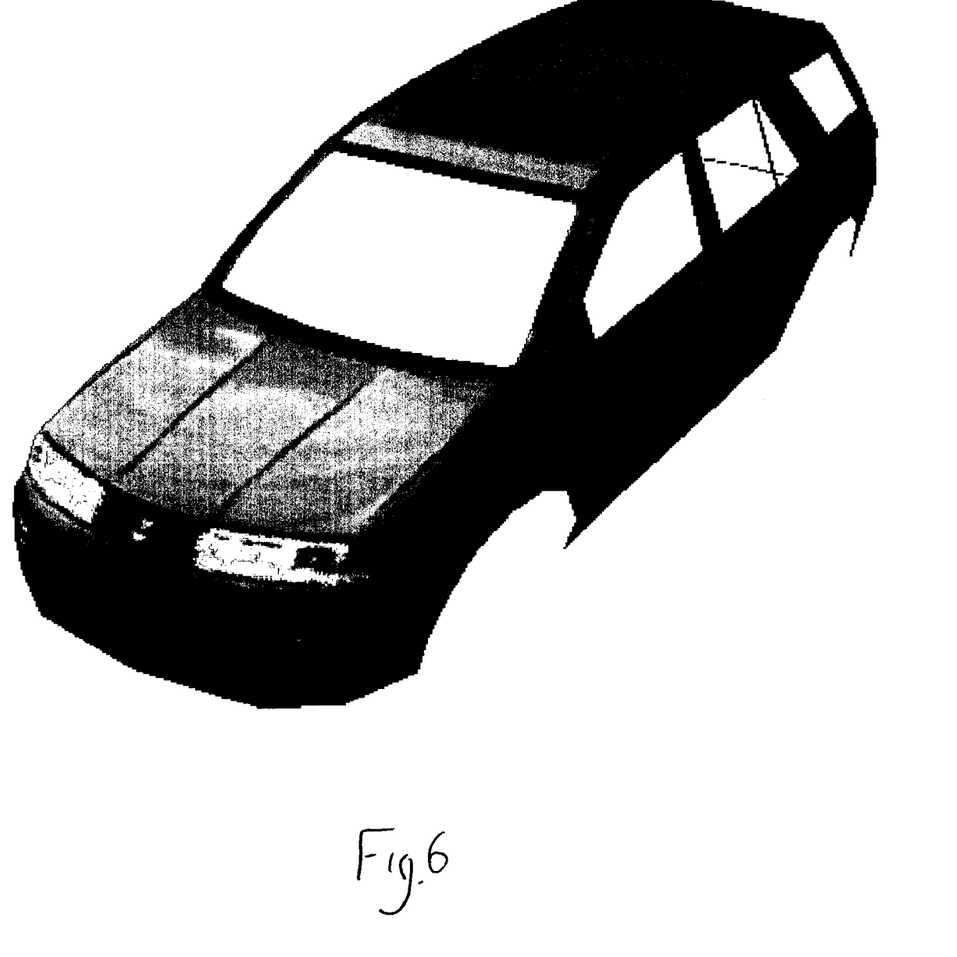
FIG. 6 is a computer rendering of the vehicle in FIG. 1 from the second viewing position illustrating, in red, polygon areas occluded in the first viewing position.
Figure 7:
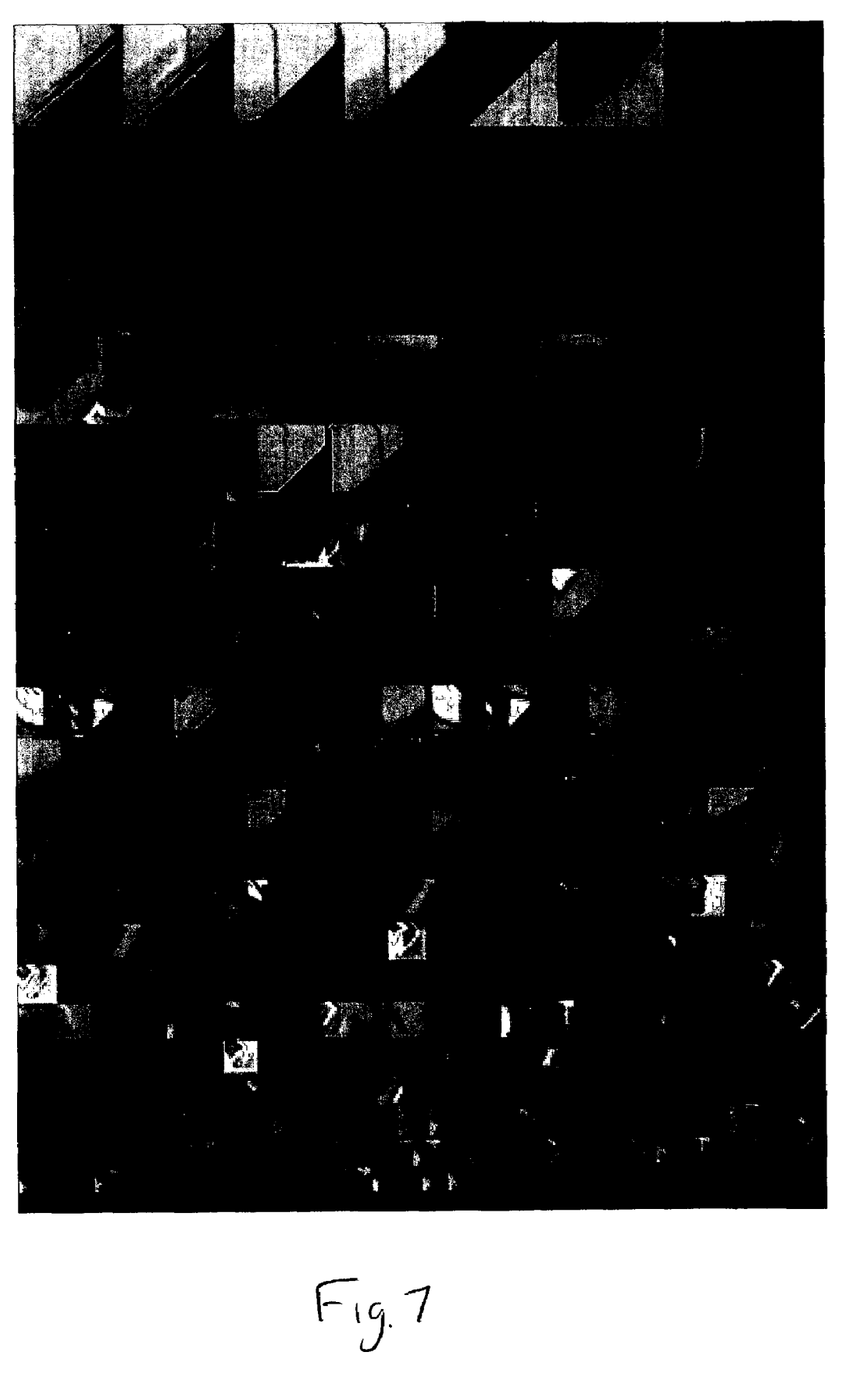
FIG. 7 is an optimized 2-D rendering of the vehicle of FIG. 1 with occluded polygons depicted in red.

FIG. 4 illustrates a computer rendering of the vehicle in FIG. 1 from the first viewing position, and it will be appreciated that occluded polygons abound from such a viewing position. Without the MTCS of the present invention, an image can appear with surreal qualities, as illustrated in FIG. 5. Such occluded polygons appear on a vehicle in FIG. 6 in red. Therefore, the next step is locating and identifying any occluded polygons and, if occluded polygons are found, extracting image data from where projection of the occluded polygons is non-occluded. FIG. 7 depicts a MTCS in an optimized 2-D space with the occluded polygons appearing in red.

Figure 8:
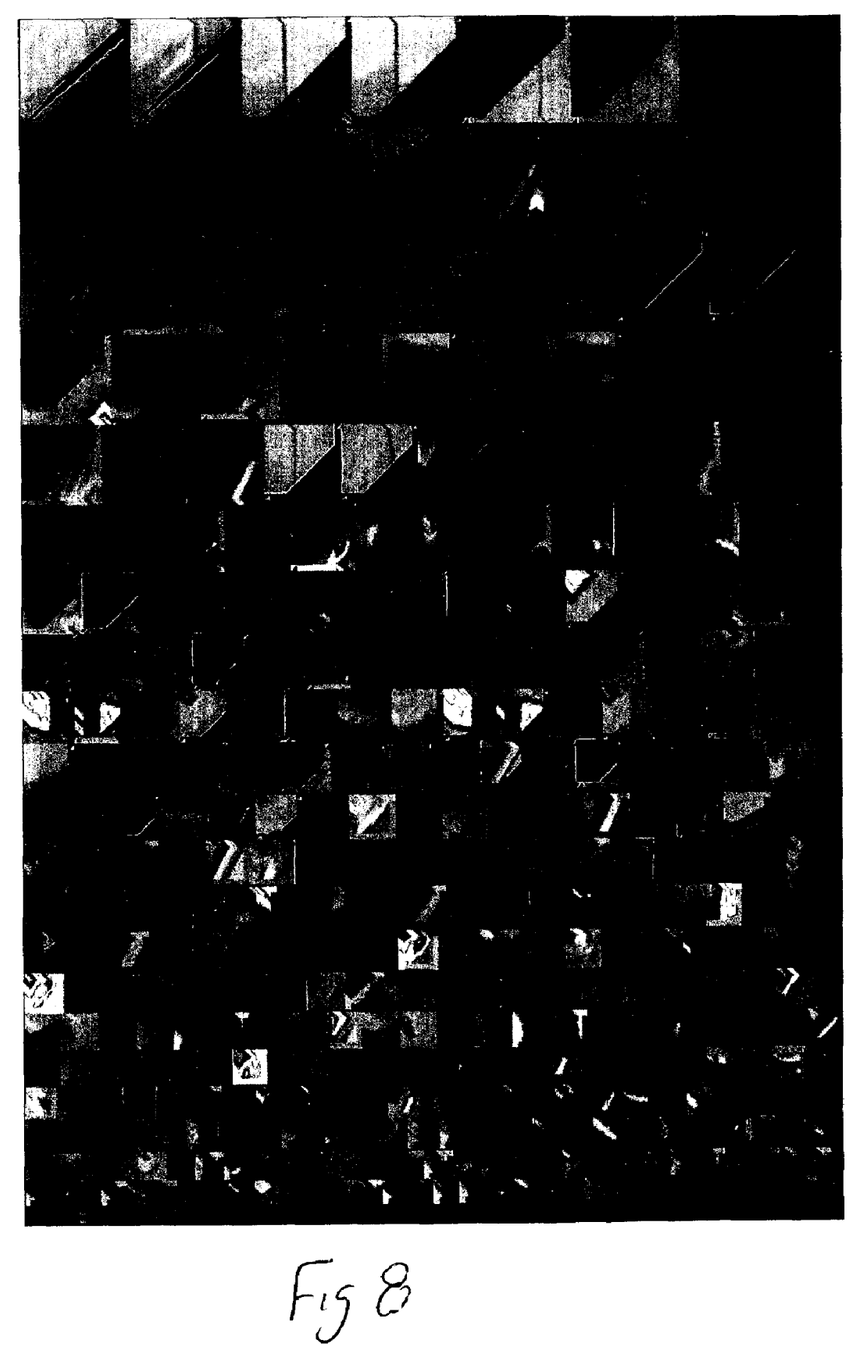
FIG. 8 is an optimized 2-D rendering of the vehicle of FIG. 1 with view-dependent texture data applied.
Figure 9:
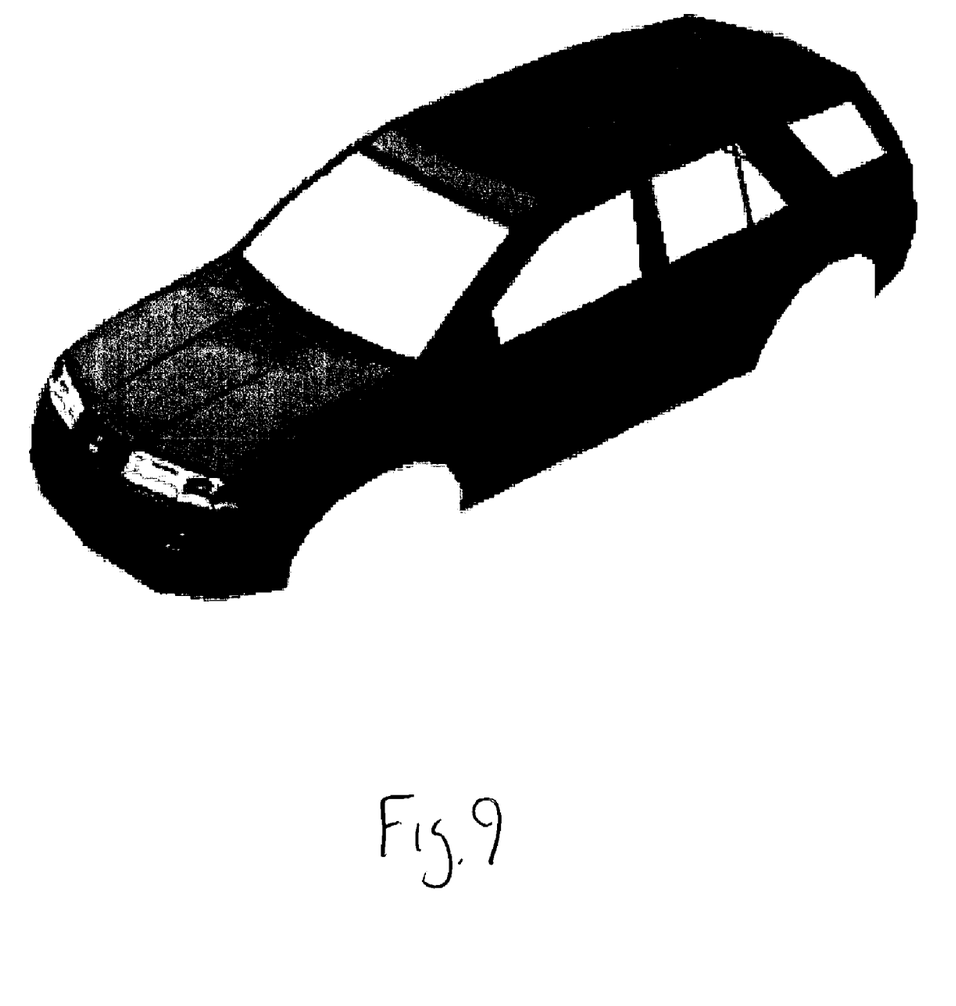
FIG. 9 is a computer rendering of the vehicle in FIG. 1 utilizing view-dependent texture data according to the preferred embodiment of the present invention.

The next step includes assigning texture coordinate data to each projected vertex on the mesh using the master texture coordinate space, thereby providing common texture data for each image in the graphic data code segment. FIG. 8 illustrates an optimized 2-D space with the occluded polygons accounted for. FIG. 9 illustrates a rendered image using the present view-dependent texture data.

The present method can also be described in greater detail. The first step in the method is to determine a relative position of each pixel in a source image with respect to each viewing or camera position. The relative position data is used to form a low polygonal count mesh. One of the methods for obtaining the mesh is a voxel coloring method, an example of which is disclosed in *Photo-Realistic Scene Reconstruction By Voxel Coloring*, S. N. Seitz and C. R. Dyer, *Process Computer Vision And Pattern Recognition Conference*, 1997 1067-1073. The voxel coloring method is not the only method available. A correspondence-based triangulation method may also be used. Additionally, digitizing the physical object that is the subject of the images can provide the necessary data to form the mesh. It may be apparent to those skilled in the art that other methods are available for determining the relative position of each pixel in the source images with respect to camera, or viewing position. Any method resulting in the mesh formed from position data should be sufficient although either of the three methods discussed hereinafter are preferred.

The mesh data structure is then processed to form a low polygon count mesh that is used as the underlying construct for view-dependent texturing. Next, the mesh is reformed into an optimized 2-D space creating the MTCS. The MTCS is then processed to assign a common projected texture coordinate for each vertex on the mesh.

This process results in a data structure including a set of common texture coordinates. Each of the source images is then remapped into the MTCS by first projecting the source image into the model space. This is used to determine correspondence between pixels in the source image and the non-occluded polygons on the polygonal mesh. These processes are used to determine intersecting image data and this intersecting image data structure is remapped into the MTCS.

Occluded polygons are calculated from the viewing position of each source image on the polygon mesh. Then, a secondary set of image data for each occluded polygon is calculated from any remaining source image. The secondary image data is then mapped into the MTCS and the resultant MTCS provides view-dependent texture data for application to the underlying geometry of the image.

It should be noted that during the calculation of the secondary image data for each occluded polygon, specularity retention may be enhanced by constraining a path determined by the optimal viewing position of the resultant object. Once the common texture coordinates and the secondary texture coordinates prepared and processed, the resultant MTCS provides the view-dependent texture data to be applied to the image. According to the method of the present invention, the visual calibration system includes a grid having known coordinates. Further, the acquisition of the source image data may include constraining a path determined by the optimal viewer position of the resultant object in order to preserve undefined object details in any the source image.

Preferably, the source image data is weighted to synthesize a predetermined resultant appearance of a displayed image.

The low polygon count mesh may be formed using a voxel coloring method. Additionally, the low polygon count mesh may be formed by digitizing a physical object that is the subject of the source images. Further, the low polygon count mesh may be formed using a correspondence-based triangulation method.

The MTCS provides the foundation of the texture data code segment that is in operational association with the graphic data code segment representing the graphical image. These two code segments, and more, appear in the computer systems according to the present invention that display graphic image data, with the graphic image data utilizing view-dependent texture data for enhancement of the image. Therefore, the present computer system is preprogrammed to provide the graphic data code segment and the texture data code segment. This preprogramming may exist in the form of an RPC file or other image data file.

Along with the method and system, present invention is directed to a computer program embodied on the computer readable medium. The medium may be a floppy disc, a tape, a CD-ROM or any other data storage medium now known or yet to be developed. The data is independent of the medium, and as long as the medium will carry digital data, it should be sufficient for operations with the present invention. The computer program provides a graphic data code segment and a texture data code segment with the texture data code segment containing texture data developed according to the method discussed above.

Similarly, the present invention is directed to a computer-readable medium storing computer-executable instructions for providing a graphic image utilizing view-dependent texture data. The computer-readable medium, in this case, will include computer executable instructions defining a graphic data code segment to provide a graphic image. The medium also includes computer executable instructions defining a texture data code segment that is in operational association with the graphic data code segment. Operational association indicates that the code segments can work together to provide a common image, but need not be physically in the same location as the graphic image. The texture data code segment includes view-dependent texture data that is formed in accordance with the method discussed above.

Finally, the present invention exists in the form of a computer signal modulating a carrier wave or embodied in a carrier wave that includes computer executable instructions defining graphic data and texture data code segments for providing data representing a photographically-derived graphic image. The carrier wave is intended to represent Internet transmission or other wireless transmission of the present invention.

The data signal carrier wave defines a graphic data code segment to provide data representing a photographically-derived graphic image and computer executable instructions defining a texture data code segment in operational association with the graphic data code segment. The texture data code segment includes the MTCS and the texture data obtained by following the method discussed above.

In all cases discussed above, the image and texture data may be weighted during processing to produce a predetermined result within the displayed image.

By the above the present invention provides a method and system in addition to a computer program recorded on computer readable media. The media itself contains the executable instructions defining the graphic data code segment and the photographically-derived graphic image. Additionally, the present invention enhances the use of graphic software for presenting three dimensional photorealistic images.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

We claim:

1. A computer-readable medium embodied with a computer program for providing a graphic image utilizing view-dependent texture data, said computer program comprising:
   a graphic data code segment for providing data representing a graphic image; and
   a texture data code segment in operational association with said graphic data code segment, said texture data code segment including view-dependent texture data formed by steps of:
   deriving a three-dimensional polygon mesh from data obtained from at least one of a plurality of two-dimensional source images;
   forming a single master texture coordinate space by mapping said polygon mesh into an optimized 2-D space;
   forming at least one two-dimensional master image by remapping each of said plurality of source images into said single master texture coordinate space, wherein said master texture coordinate space comprises a single set of texture coordinates for all source images such that the single master texture coordinate space is utilized for all source images without requiring a new map, wherein each source image corresponds to a different viewing or camera position for a graphic image for display;
   locating and identifying any occluded pixels in the master image and, if occluded pixels are found, replacing occluded pixels with a combination of one or more non-occluded pixels from other source images; and
   assigning texture coordinate data to three-dimensional coordinates on said mesh by mapping the three-dimensional coordinates to two-dimensional coordinates using said master texture coordinate space, thereby providing common texture data for each master image.

2. A method of displaying a digital graphic image, the method comprising:
   defining a graphic data code segment in computer-executable instructions for providing data representing a graphic image; and
   defining a texture data code segment in operational association with said graphic data code segment, said texture data code segment including view-dependent texture data formed by:
   deriving a non-coplanar three-dimensional polygon mesh from data obtained from at least one of a plurality of two-dimensional source images;
   forming a master texture coordinate space by mapping said polygon mesh into an optimized 2-D space;
   forming at least one two-dimensional master image by remapping each of said plurality of source images into said master texture coordinate space, wherein said master texture coordinate space comprises a single set of texture coordinates for all source images such that a single master texture coordinate space is utilized for all source images without requiring a new map for each source image, wherein each source image corresponds to a different viewing or camera position for a graphic image for display;
   locating and identifying any occluded pixels in the master image, and if occluded pixels are found, replacing occluded pixels with a combination of one or more non-occluded pixels from other source images;
   assigning texture coordinate data to three-dimensional coordinates on said mesh by mapping the three-dimensional coordinates to two-dimensional coordinates using said master texture coordinate space, thereby providing common texture data for each master image; and using said master images provided with said common texture data to display a digital graphic image.

* * * * *